US012039524B2

United States Patent
Kalaboukis et al.

(10) Patent No.: US 12,039,524 B2
(45) Date of Patent: *Jul. 16, 2024

(54) TRANSFER VIA TRANSACTION APP

(71) Applicant: Wells Fargo Bank, N.A., San Francisco, CA (US)

(72) Inventors: Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,157

(22) Filed: Apr. 20, 2023

(65) Prior Publication Data

US 2023/0259921 A1    Aug. 17, 2023

Related U.S. Application Data

(63) Continuation of application No. 16/858,104, filed on Apr. 24, 2020, now Pat. No. 11,663,587.

(51) Int. Cl.
*G06Q 40/02* (2023.01)
*G06F 8/60* (2018.01)
(Continued)

(52) U.S. Cl.
CPC ............. *G06Q 20/382* (2013.01); *G06F 8/60* (2013.01); *G06F 9/44505* (2013.01);
(Continued)

(58) Field of Classification Search
None
See application file for complete search history.

(56) References Cited

U.S. PATENT DOCUMENTS 8,185,460 B1    5/2012  Vaughan
9,262,643 B2    2/2016  Cidon et al.
(Continued)

FOREIGN PATENT DOCUMENTS

WO    WO-2008086630 A1    7/2008

OTHER PUBLICATIONS

"U.S. Appl. No. 16/858,104, Notice of Allowance mailed Jan. 19, 2023", 10 pgs.
(Continued)

*Primary Examiner* — Ryan D Donlon
*Assistant Examiner* — Irene S Kang
(74) *Attorney, Agent, or Firm* — SCHWEGMAN LUNDBERG & WOESSNER, P.A.

(57) ABSTRACT

Systems and methods may generally include sending an executable application, which when executed, automatically causes a monetary transfer. An example method may include performing, at a first user device, a handshake with a second user device, receiving, during the handshake, an operating capability of the second user device, and configuring, based on the operating capability of the second user device, an executable application, which when executed, automatically causes a monetary transfer to occur. The configured executable application may be sent to the second user device for execution.

20 Claims, 5 Drawing Sheets

(51) Int. Cl.
*G06F 9/445* (2018.01)
*G06F 16/25* (2019.01)
*G06F 21/12* (2013.01)
*G06Q 20/10* (2012.01)
*G06Q 20/22* (2012.01)
*G06Q 20/32* (2012.01)
*G06Q 20/36* (2012.01)
*G06Q 20/38* (2012.01)
*G06F 11/00* (2006.01)
*G06F 21/10* (2013.01)
*G06Q 40/04* (2012.01)

(52) U.S. Cl.
CPC ........ *G06F 9/44594* (2013.01); *G06F 16/258* (2019.01); *G06F 21/12* (2013.01); *G06Q 20/108* (2013.01); *G06Q 20/223* (2013.01); *G06Q 20/326* (2020.05); *G06Q 20/3676* (2013.01); *G06Q 40/02* (2013.01); *G06F 21/1062* (2023.08); *G06Q 2220/00* (2013.01)

(56) References Cited

U.S. PATENT DOCUMENTS

| | | | |
|---|---|---|---|
| 9,398,426 B2 | 7/2016 | Kristiansson et al. | |
| 9,424,421 B2 | 8/2016 | Aissi et al. | |
| 9,542,552 B2 | 1/2017 | Peterson | |
| 9,635,486 B2 | 4/2017 | Ford et al. | |
| 10,715,497 B1* | 7/2020 | Maeng | H04L 63/126 |
| 10,984,409 B1* | 4/2021 | Maeng | G06Q 20/363 |
| 11,250,422 B1* | 2/2022 | Hayes | G06Q 20/3829 |
| 2002/0123964 A1* | 9/2002 | Kramer | G06Q 20/04 |
| | | | 705/40 |
| 2002/0199187 A1 | 12/2002 | Gissin et al. | |
| 2004/0083179 A1* | 4/2004 | Sesek | G06Q 20/04 |
| | | | 705/53 |
| 2013/0124606 A1 | 5/2013 | Carpenter et al. | |
| 2014/0074605 A1* | 3/2014 | Sanchez | G06Q 40/03 |
| | | | 705/14.64 |
| 2015/0347374 A1 | 12/2015 | Rehtijrvi | |
| 2016/0034900 A1* | 2/2016 | Nelsen | G06Q 20/4016 |
| | | | 705/44 |
| 2018/0082288 A1* | 3/2018 | Chester | G06Q 20/3821 |
| 2018/0144341 A1* | 5/2018 | Kärkkäinen | G06Q 20/02 |
| 2019/0108586 A1* | 4/2019 | Jayaram | G06Q 40/04 |
| 2019/0197814 A1* | 6/2019 | Senguttuvan | G07F 7/0886 |
| 2021/0334792 A1 | 10/2021 | Kalaboukis et al. | |

OTHER PUBLICATIONS

"Payment data cryptography for merchants", Google Pay API, [Online]. Retrieved from the Internet: <URL: https://developers.google.com/pay/api/web/guides/resources/payment-data-cryptography>, (Dec. 11, 2018), 2 pgs.

Hawblitzel, Chris, et al., "Ironclad Apps: End-to-End Security via Automated Full-System Verification", 11th USENIX Symposium on Operating Systems Design and Implementation (OSDI) pp. 165-181, [Online]. Retrieved from the Internet: <URL: https://www.usenix.org/system/files/conference/osdi14/osdi14-paper-hawblitzel.pdf>, (Oct. 6, 2014), 18 pgs.

Zhenge, Guo, et al., "Secure Device Pairing via Handshake Detection", Tsinghua Science and Technology, vol. 23, No. 5, (Oct. 2018), 621-633.

* cited by examiner

TRANSFER VIA TRANSACTION APP

CROSS-REFERENCE TO RELATED APPLICATION

This application is a continuation of U.S. patent application Ser. No. 16/858,104, filed Apr. 24, 2020 which is incorporated by reference herein in its entirety.

BACKGROUND

Many techniques for transferring money have been used over the course of human history. With the advent of computing technology, speed of transfers has increased, while security of transfers has become an issue. While many techniques exist for transferring money via a computing device, they typically require an exchange of information that may lead to a security issue or may not be secure enough to withstand future attacks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
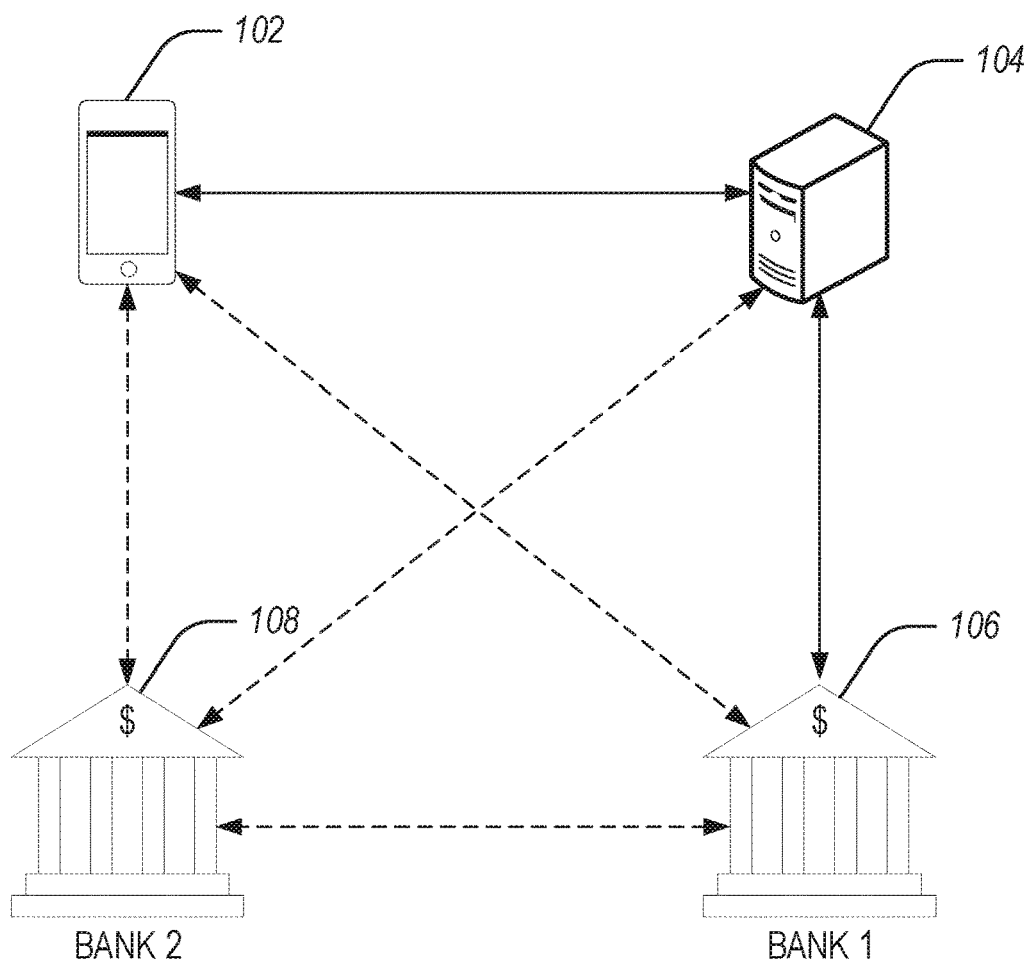
FIG. 1 illustrates a system for sending an executable application, which when executed, automatically causes a monetary transfer in accordance with some embodiments.

The systems and methods described herein may be used to securely send an executable application for execution. The executable application may automatically cause a monetary transfer to occur. The executable application may be configured based on capabilities or a configuration of an executing device. In an example, the monetary transfer may occur without any communication between a device sending the executable application and an executing device other than an initial communication and the sending of the executable application. The personal information sent between the two devices may be limited, for example to only a bank name of the sending device.

The executable application may be used to initiate a monetary transfer or other financial transaction using any of a myriad number of techniques. The technique selected may depend on a country, state, or general location of the executing device, may depend on a transferor bank or a transferee bank, may depend on other apps or accounts available, configurations, or capabilities of the executing device, may depend on communication bandwidth between the two devices, or may depend on the type of transaction intended. For example, the executable application, when executed on the executing device, may initiate a communication with a bank to put in a transfer order, a wire, bank-to-bank transfer or the like. In another example, the executable application may send information to another app available on the executing device to complete a monetary transfer (e.g., via a digital wallet or P2P money transfer app). In examples where the transferor bank and the transferee bank are the same bank, the executable application may send a message to that bank to move money from one account to another.

The handshake between a sending device and an executing device may include establishing a connection (e.g., via Bluetooth, over wi-fi, via a network connection such as a 4G or 5G network, via near field communication (NFC), or via other network-based or P2P connections). During the handshake, the executing device may send or be requested to send one or more capabilities or configurations of the executing device to the sending device. The sending device may use the information received from the executing device to configure the executing application. For example, the executing application may be configured to only execute within a secure environment (e.g., a trusted execution environment (TEE), a software guard extension (SGX), or other secured memory or processing environment, such as a dedicated device), only on a wi-fi network or wired network, only when the executing device is not on battery power (e.g., plugged in to an outlet), or the like. The executing application may be configured based on any one or combination of configurations or capabilities of the executing device, or the executing application may be configured without consideration of the configurations or capabilities of the executing device. Further examples are described herein below.

When two individuals wish to exchange money, they may wish to use an app to transfer money from one account to another. However, it is not always safe to send account information (e.g., when the two individuals are strangers), apps may charge fees or intercept personal information, or the two individuals may not both have the same app available. These circumstances may make a transaction impossible, require one or both of the individuals to download a new app and share financial information with yet another company, share personal information with the other individual, pay fees, etc. To solve the various technical problems related to security, functionality, and capabilities of various devices, the present systems and methods describe an executable application that may be sent from a first user device to a second user device to initiate or complete a monetary transfer.

Apps that are used to transfer money are typically downloaded from a website or app repository (e.g., an app store for a mobile framework), and usually require an account or registration. These apps further may be tied to a particular bank or company for transferring money, and may require exchange of personal information (e.g., at least name or username) to initiate a transfer. The presently described executable application may be sent from one user device to a second user device, via a network or directly, without needing to download an app from a website or store. The executable application may be uniquely configured by a sending device for executing on a receiving device.

The executable application may avoid exposing personal details of users of the first user device or the second user device, for example by securely executing a transfer. In an example, nothing more than a phone number, IP address, MAC address, email address, or other public identification of the devices may be shared. For example, when the user devices are each mobile phones, the executable application may be sent via text message (or a link to the executable application may be sent via text message), sharing only the phone numbers of the user devices. In other examples, the executable application or a link to the executable application may be sent via a messaging app (e.g., a secure app such as an end-to-end encrypted app), removing even the need to share phone numbers (e.g., a throwaway or single use account name or username may be generated for the transfer). Once transferred, the user devices do not need to have any further communication, in an example.

In an example, the executable application may include details of the transaction, such as a transferor account, a bank, or an amount to transfer. When the executable application includes one or more of these details or other information (e.g., a transfer time, a transferee account, etc.), the information may remain encrypted on the receiving device, even when the executable application is executed on the receiving device. For example, the receiving device may add a transferee account to the encrypted details of the executable application when executed, and the information may remain encrypted when sent to a bank or service for completing the transfer, which may then decrypt the information. In other examples, the user of the sending user device may designate what information is available to be decrypted by the receiving device, such as an amount (e.g., for confirmation). Other examples of the data to decrypt include payment period, payment date, drip payment details, or the like.

In another example, the executable application may include an identifier unique to the transfer and the sending device, which may be later contacted by a bank or other transferring service provider to complete the transaction. The identifier may be sent by the sending device to the bank or service, in an example. The identifier may be extracted from the executable application to complete the transaction, according to an example. The bank or service may extract a transferor account and an amount, from the identifier. In an example, the sending device may include a transferee account when sending the identifier to the bank or service. The identifier may include security information (e.g., an encrypted PIN or account number identifier) that may be used by the bank or service to confirm details of the transfer or confirm that the transfer is authorized (e.g., by the accountholder of the transferor account).

In some examples, instead of directly sending the executable application, the sending device may send a link to the executable application. The link may include a website, a memory location (e.g., for obtaining from the sending device or a server), or the like for the receiving device to access the executable application. In an example, the link may be operable to download the executable application only by the receiving device. This restriction may be configured by the sending device based on information obtained during the handshake (e.g., restricting access to the MAC address of the receiving device or other security measures, such as encryption). The executable application may be run by the receiving device after being obtained via the link.

FIG. 1 illustrates a system 100 for sending an executable application, which when executed, automatically causes a monetary transfer in accordance with some embodiments. The system 100 is illustrated with a sending device (e.g., first user device 102), a receiving device (e.g., second user device 104), and at least one bank or service (e.g., bank 106, bank 108). Though the banks 106 and 108 are shown in FIG. 1, a service may be used instead of the bank, for example a clearing service, a money lending service, a central bank, a company providing app services, a consortium, or the like. Further, though the first user device 102 is shown as a mobile device (e.g., a cell phone or tablet) and the second user device 104 is shown as a desktop computer, any user device (e.g., wearable, watch, phone, laptop, tablet, desktop computer, car, etc.) may be used as either the sending or receiving device.

Connections between the various devices and banks or services are shown in FIG. 1, including a connection between the first user device 102 and the second user device 104 and a connection between the second user device 104 and the bank 106. Other optional connections are also shown, including between the first user device 102 and the bank 106, the first user device 102 and the bank 108, the second user device 104 and the bank 108, or between the banks 106 and 108. The optional connections may be sued to perform various aspects of the techniques described herein, but are not needed for other aspects.

Initially, the first user device 102 and the second user device 104 may perform a handshake, or perform some other initial communication to exchange at least one detail of the second user device 104. The detail may include a configuration of the second user device 104 or a capability of the second user device 104. Configurations or capabilities may include operating system (OS) type, OS version, firmware details, device type, available memory, processor information, communication capabilities (e.g., wired or wireless, different types of wireless communication, such as a Bluetooth antenna, a wi-fi antenna, a radio communication antenna, etc.), location, user enabled preferences, available bandwidth (e.g., directly between the two user devices 102 and 104 or via a network connection), trusted or secure environment information (e.g., a TEE or a SGX available at the second user device 104), available apps at the second user device 104, preferred format for the executable application, bank information, a requested amount for transferring, a transferee account, or the like.

In the cases of any or all of bank information, a requested amount, or a transferee account being sent in the handshake from the second user device 104 to the first user device 102, these details may be encrypted or otherwise not accessible to a user of the first user device 102. For example, the bank information may be encrypted, but incorporated into the executable application such that when the executable application is executed, a user of the first user device 102 may authenticate with its bank that the money was transferred to the correct bank. In an example, the requested amount may be presented or available on the first user device 102 to confirm the amount requested is correct. In another example, the requested amount (sent in the handshake by the second user device 104) may be hidden from the user of the first user device 102, and compared to a sent amount (from the first user device 102) when the executable application is executed, and when the amounts differ, the transfer may be canceled or additional information may be requested from the first user device 102. In yet another example, the executable application may fail to compile unless the amount input by a user of the first user device 102 matches an amount sent by the second user device 104. In an example, a particular bank may require a minimum security level or a specific type of security, such as an encryption level or type. This requirement may be used in the executable application (which may be conveyed in the handshake). The bank requirement may come, for example, from a bank of a user of the second user device 104. The bank may require a certain security strength for the algorithm to be used. For example, the bank may require ECC-256 for traditional algorithm or Rainbow VI for post quantum cryptography (PQC).

The configurations or capabilities that are sent from the second user device 104 to the first user device 102 during the handshake may be selected by a user of the second user device 104 (e.g., all configurations or capabilities may be opt in). The first user device 102 may request information about a particular configuration or capabilities or may request information generally. In either example, the second user device 104 may control what information is sent to the first user device 102.

The handshake may be used to initiate a communication channel between the first user device 102 and the second user device 104 (e.g., a direct connection or information for a network connection, such as a phone number). Once the handshake is completed, the communication channel may be used to send a configured executable application from the first user device 102 to the second user device 104. In some examples, the first user device 102 may configure the executable application based on capabilities of the second user device 104 received or derived from other sources, such as an intermediary, a bank, an app store, information stored at the first user device 102 (e.g., based on previously received information from the second user device 104), user entered information (e.g., at the first user device 102), or the like. In an example, when RSA is not the desired algorithm this information may be obtained from other sources, and the first device may take this information into account. Similarly a different variant for a PQC may be chosen given a previously used PQC variant has been discarded.

Before sending, the first user device 102 configures the executable application, for example based at least on one or more of the configurations or capabilities received from the second user device 104 during the handshake. For example, the first user device 102 may configure the executable application to have more security (e.g., a higher level of encryption) when more memory or processing capabilities are available on the second user device 104. In an example, the executable application may be configured to have a smaller file size when bandwidth availability is limited.

Some configuration choices for the executable application may be tied to threshold or range values for various aspects of the configurations or capabilities of the second user device 104, such as available memory or processing power, bandwidth, etc. Other configuration choices for the executable application may be tied to yes or no aspects of the configurations or capabilities of the second user device 104, such as OS type, firmware, device type, etc.

After receiving the executable application, the second user device 104 executes the executable application. Executing the executable application may include compiling the executable application or running the executable application (e.g., in a secure environment). When executed, the executable application may output an indication to a bank or service (e.g., send a wire transfer, a request for funds, or the like), may ask a user of the second user device 104 for additional information (e.g., a transferee account, an amount, etc.), or may open another app (e.g., a money transfer app already installed on the second user device 104). In an example, the executable application includes all necessary information to complete the monetary transfer (e.g., by sending financial information such as amount, authorization, and transferor account to a bank). In another example, additional information must first be confirmed or downloaded. In an example, the executable application includes instructions that are performed by the processor to contact the bank and securely send the information.

In an example, the executable application may be generated from a file or files downloaded by the first user device 102. For example, the first user device 102 run an app that generates the executable application, for example in response to user selections of configuration details or automatically based on the handshake. In an example, the first user device 102 runs an app that initiates a handshake with the second user device 104 and then configures the executable application based on information received during the handshake (and optionally based on information received from a user of the first user device 102 or information stored at the first user device 102, such as a transferor account, an amount, a bank, etc.). The executable application may be configured based on information received from a third party device, such as an app store, a server, a bank, a regulatory agency, or the like. For example, the first user device 102 may configure the executable application based on capabilities received from the second user device 104 and according to minimum security requirements received from a bank or regulatory agency.

The app may compile the executable application from source code with modifications based on the information. In another example, a list of available executable applications may be provided on a user interface of the first user device 102, which may be selected based on the handshake. The first user device 102 may receive a selection of one of the available executable applications to send to the second user device 104.

After executing the executable application, an indication may be sent to bank 106 (e.g., by the second user device 104). The indication may be sent via the executable application itself, or using a messaging application or service, a bank app of the bank 106, or the like. The bank 106 may complete the monetary transfer based on the indication. The bank 106 may optionally communicate with the bank 108 (e.g., when the transferor account is at bank 108 and the transferee account is at bank 106, or vice versa), with the second user device 104 (e.g., by asking for a confirmation or transferee account information), with the first user device 102 (e.g., to confirm the transaction), or the like. When contacted (e.g., via the bank 106), the bank 108 may communicate with one or both of the user devices 102 or 104 to confirm details of the transaction or request information.

The executable application may be configured to execute in a secure environment, such as a trusted execution environment (TEE), a secure enclave region of memory of the second user device 104 or another trusted device, or the like. In an example, when outside the secure environment (e.g., of the second user device or in a secure environment of another device), the executable application may be configured to not run or execute. In some examples, after initially running in the secure environment, one or more other secure environments or insecure environments may be authorized to run parts of the executable application, for example when a transaction necessitates a proxy server or another account is held or maintained elsewhere.

The executable application (or a modified version of the executable application configured to one or more configurations or capabilities of the first user device) may be run on the first user device. For example, in response to receiving an indication, at the first user device, that the second user device has run the configured executable application, the first user device may run a version of the executable application configured according to at least one operating capability of the first user device. The version of the executable application may, on execution, confirm a monetary transfer, send an indication to a bank or other device (e.g., the transferor account bank), or the like.

Figure 2:
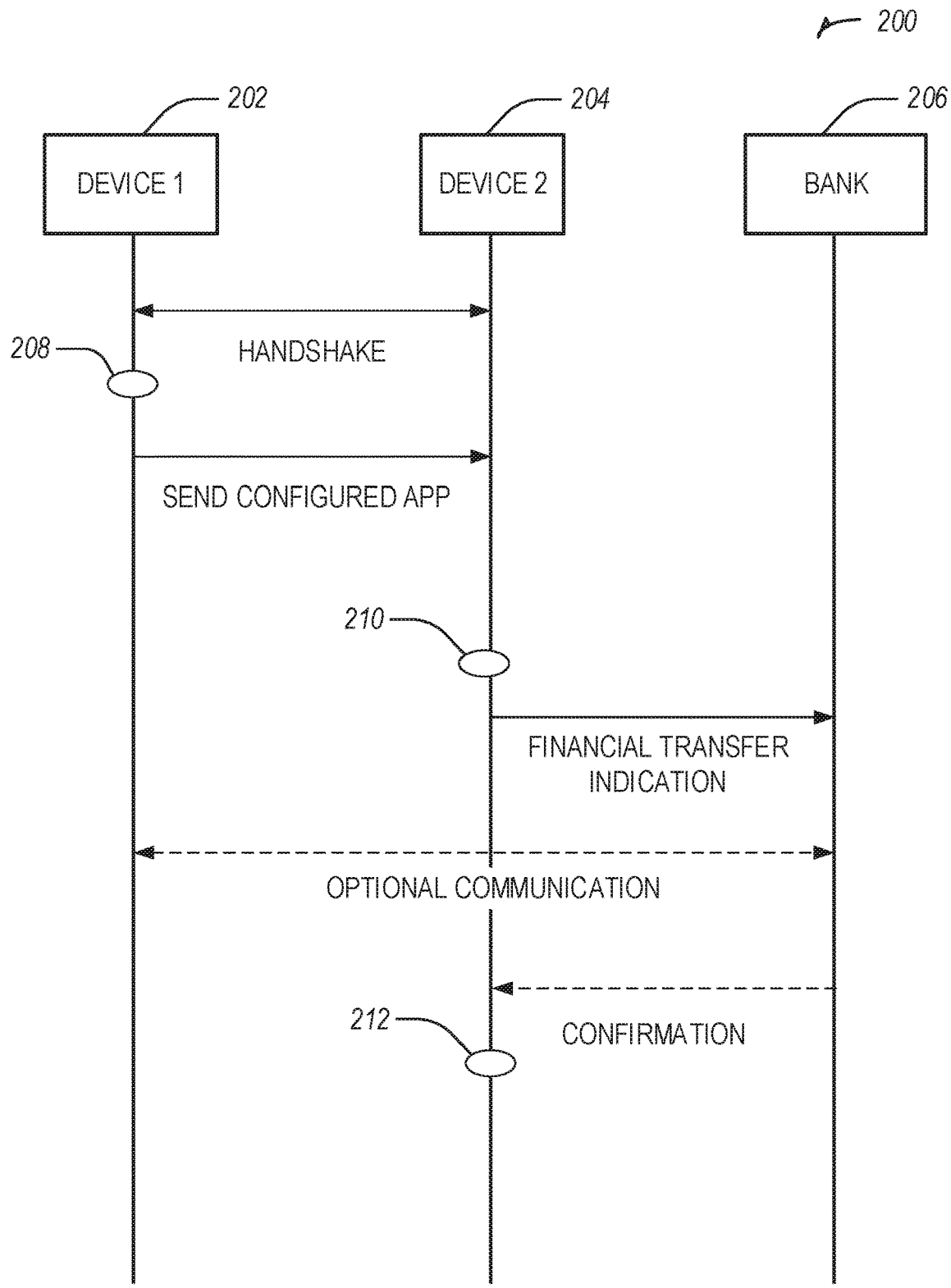
FIG. 2 illustrates a timing diagram based on using an executable application sent to effectuate a monetary transfer in accordance with some embodiments.

FIG. 2 illustrates a timing diagram 200 based on using an executable application sent to effectuate a monetary transfer in accordance with some embodiments. The timing diagram 200 shows a first user device 202, a second user device 204, and a third entity 206 (e.g., a bank server or other device, a forwarding service, a cloud server, or the like). The timing diagram 200 illustrates operations for sending an executable application that, when run, may cause a monetary transfer to occur. The first user device 202 may include the first user device 102 of FIG. 1. The second user device 204 may include the second user device 204 of FIG. 2.

Initially, a handshake may occur between the first user device 202 and the second user device 204. At event 208, an executable application is configured on the first user device 202 based on information obtained during the handshake. The configured application (e.g., a configured executable application) is sent to the second user device 204. At event 210, the configured executable application is run on the second user device 204. A financial transfer indication may be sent to the bank 206 based on an output of the executed configured executable application. The bank 206 may optionally communicate with the first or second user devices 202 or 204. For example, the bank 206 may send a confirmation request or confirmation indication to the first user device 202. The bank 206 may send a confirmation to the second user device 204 indicating that the monetary transfer was successfully received by the bank 206, initiated at the bank 206, or completed by the bank 206, depending on the nature of the monetary transfer (e.g., a wire transfer may be indicated as received, a bank to bank transfer may be indicated as initiated, a transfer entirely within the bank 206, such as with transferor and transferee accounts being with the bank 206, may be indicated as completed, or the like). The bank 206 may communicate with a second bank as necessary for completing the monetary transfer. Optionally, at event 212, the configured executable application may delete itself from the second user device 204 after execution. In another example, the configured executable application may delete a saved instance of itself while running, or delete portions of itself before the entire run is complete. In this example, event 210 the executable application may be decrypted and verified by the second user device 204 to be correctly signed by the first user device 202.

In an example, before the handshake, the first user device 202 may obtain a certificate or public key (e.g., for a PKI) of the second user device 204 such that the first user device 202 may encrypt the executable application for the second user device 204 (which may decrypt using a private key). The certificate or public key may be obtained from a public source. The public source may also provide a certificate or key of the first user device 202 to the second user device 204 such that the second user device 204 may verify a signature of the first user device 202.

Figure 3:
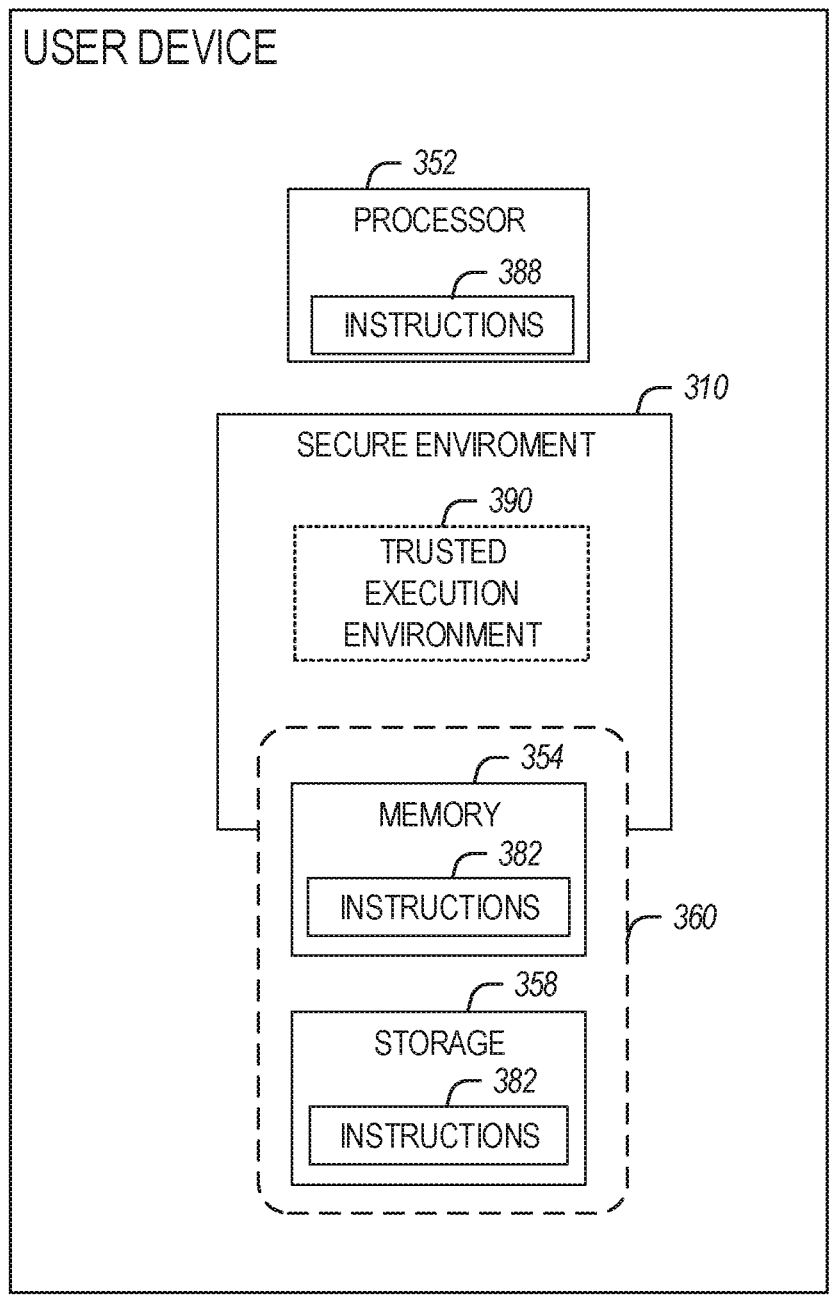
FIG. 3 illustrates a secure environment in accordance with some embodiments.

FIG. 3 illustrates a secure environment 310 in accordance with some embodiments. The secure environment 310 is illustrated on a user device 300, which may be a computer (e.g., a desktop or a laptop), a mobile device (e.g., a phone or tablet), a wearable device, or the like. The user device 300 includes a processor 352 configured to execute instructions 388, and various media, memory, or storage components. The user device 300 includes the secure environment 310, which may include a trusted execution environment 390 in an example.

The storage 358 or the memory 354 may include instructions 382 in the form of software, firmware, or hardware commands to implement the techniques described herein (e.g., via the processor 352). Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine readable medium 360 including code to direct the processor 352 to perform electronic operations in the user device 300. The processor 352 may access the non-transitory, machine readable medium 360. For instance, the non-transitory, machine readable medium 360 may be embodied by devices described for the storage 358 or may include specific storage units such as optical disks, flash drives, or any number of other hardware devices. The non-transitory, machine readable medium 360 may include instructions to direct the processor 352 to perform a specific sequence or flow of actions, for example, as described with respect to the flowchart(s) and block diagram(s) of operations and functionality depicted herein.

Also in a specific example, the instructions 388 on the processor 352 (separately, or in combination with the instructions 388 of the machine readable medium 360) may configure execution or operation of a trusted execution environment (TEE) 390. In an example, the TEE 390 operates as a protected area accessible to the processor 352 for secure execution of instructions and secure access to data. Various implementations of the TEE 390, and an accompanying secure area in the processor 352 or the memory 354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the user device 300 through the TEE 390 and the processor 352. In an example, the user device 300 may verify that the received executed application is verified or signed by a trusted third party. For example, the executable application may be verified by another app executing on the user device 300 (e.g., a banking app for verifying executable applications).

The secure environment may include hardware facilities, including a security component (SEC)—such as a trusted execution environment (TEE), hardware security module (HSM), software guard extension (SGX), trusted platform module (TPM), or the like. These facilities may store a key or other encryption or secure access information to perform encryption of data in memory (e.g., random access memory (RAM)), in storage (e.g., hard drive, solid state drive (SSD), storage class memory, etc.), on an interlink (e.g., bus), or the like.

As described herein, the user device 300 may use the secure environment 310 to execute an executable application sent from another user device to initiate a monetary transfer. The executable application may be configured to run only in the secure environment 310 (e.g., within the trusted execution environment 390), for example such that the executable application cannot execute from the memory 354 or the storage 358 outside the secure environment 310 (which may have overlap with portions of the memory 354 or the storage 358). In another example, the executable application may be configured to operate or execute within the secure environment 310 while having limited or no operability, limited or no functionality, or limited or no ability to execute outside of the secure environment.

Figure 4:
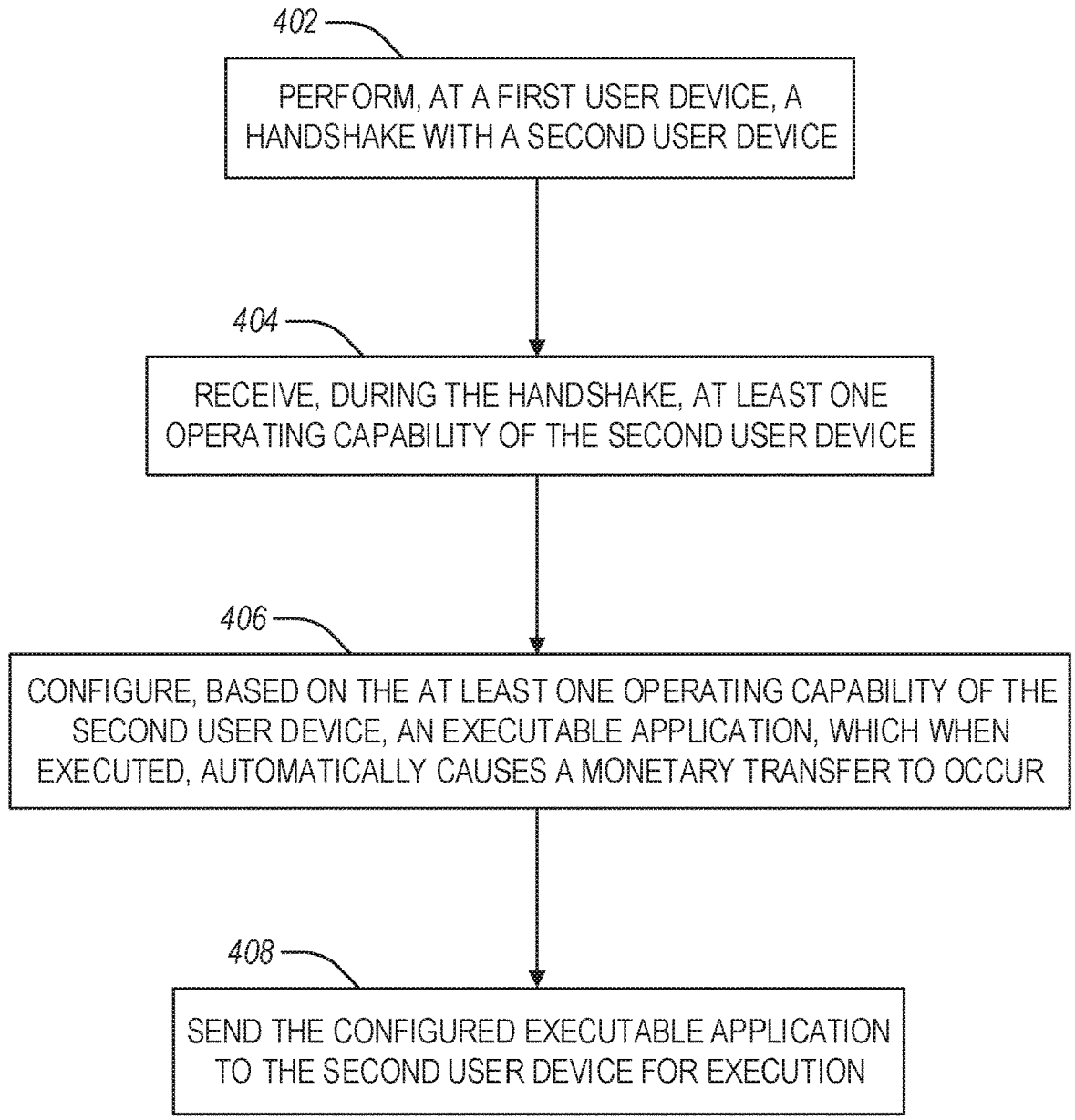
FIG. 4 illustrates a flowchart showing a technique for sending an executable application, which when executed, automatically causes a monetary transfer in accordance with some embodiments.

FIG. 4 illustrates a flowchart showing a technique 400 for sending an executable application, which when executed, automatically causes a monetary transfer in accordance with some embodiments. In an example, operations of the technique 400 may be performed by processing circuitry, for example by executing instructions stored in memory. The processing circuitry may include a processor, a system on a chip, or other circuitry (e.g., wiring).

The technique 400 includes an operation 402 to perform or initiate, at a first user device, a handshake with a second user device. During the handshake, information may be exchanged between the two user devices, such as an encryption type or a file size limit.

The technique 400 includes an operation 404 to receive, during the handshake, at least one operating capability of the second user device. In an example, the at least one operating capability of the second user device includes at least one of a device type, an OS, a hardware component, a secure environment, OS type, OS version, firmware details, device type, available memory, processor information, communication capabilities (e.g., wired or wireless, different types of wireless communication, such as a Bluetooth antenna, a wi-fi antenna, a radio communication antenna, etc.), location, user enabled preferences, available bandwidth (e.g., directly between the two user devices or via a network connection), trusted or secure environment information (e.g., a TEE or a SGX available at the second user device), available apps at the second user device, preferred format for the executable application, bank information, a requested amount for transferring, a transferee account, or the like.

The technique 400 includes an operation 406 to configure, based on the at least one operating capability of the second user device, an executable application, which when executed, automatically causes a monetary transfer to occur. The monetary transfer may occur by way of sending an indication to a bank to initiate the transfer, such as with a wire transfer, a bank to bank transfer, an intrabank transfer, or the like. The monetary transfer may occur based on information sent by the executable application, including for example, a transferor account, a transferee account, an amount, etc. this information may be sent to a bank, a clearing service, another app, a messaging service (e.g., SMS), or the like.

Operation 406 may include encrypting the executable application. Operation 406 may include configuring the executable application to only run within a secure environment of the second user device. The secure environment including an enclave region of memory of the second user device. For example, when outside the secure environment (e.g., of the second user device or in a secure environment of another device), the executable application may be configured to not run or execute. The secure environment may include a trusted execution environment (TEE), a secure element, or the like.

The technique 400 includes an operation 408 to send the configured executable application (e.g., including information indicative of a transferor account and an amount for executing the monetary transfer) to the second user device for execution. In an example, the monetary transfer may be configured to occur from the transferor account, which is an account of a user of the first device, to an account of a user of the second user device (e.g., a transferee account). In an example, operation 408 may include sending the configured executable application, including instructions, which when executed by the second user device, cause the second user device to initiate a communication with a bank to cause a monetary transfer to occur.

In an example, the configured executable application may be a single run executable application that, for example, deletes itself after running. In an example, the configured executable application may be a handler configured to convert a first data structure created by the first user device, using a first format a first monetary transfer application, to a second data structure having a second format readable by a second monetary transfer application. For example, the first monetary transfer application may send information (e.g., about a transferor account, an amount, a bank, etc.) to the executable application, and when run on the second user device, the executable application may output information to the second monetary transfer application to run or running on the second user device.

The technique 400 may include an operation to, in response to receiving an indication that the second user device has run the configured executable application, running, at the first user device, a version of the executable application configured according to at least one operating capability of the first user device. This optional operation may include outputting, from the first user device, a confirmation of the monetary transfer.

Figure 5:
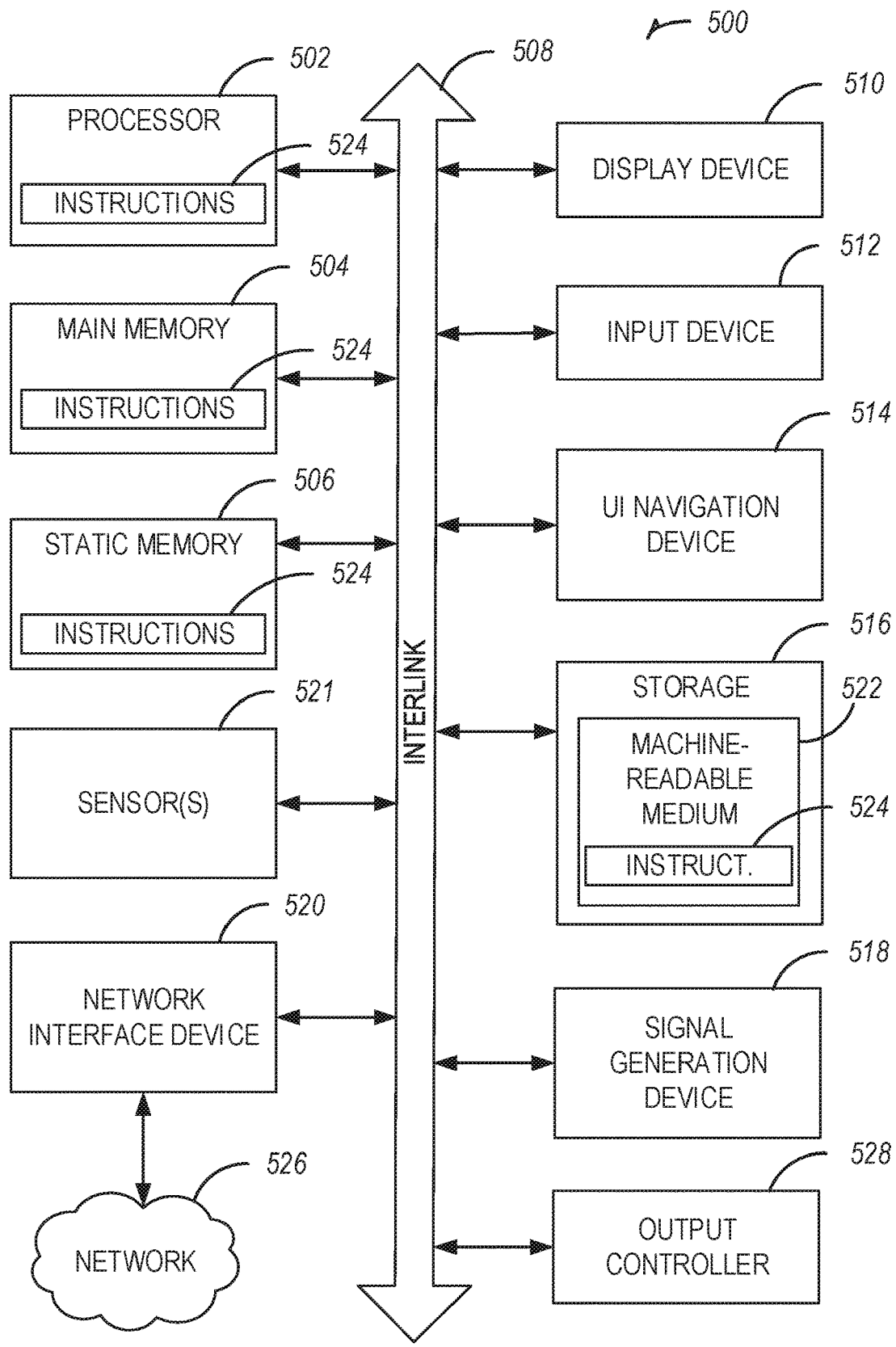
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a method comprising: performing, at a first user device, a handshake with a second user device; receiving, during the handshake, an operating capability of the second user device; configuring, using a processor of the first user device and based on the operating capability of the second user device, an executable application, which when executed, automatically causes a monetary transfer to occur; and sending the configured executable application, including information indicative of a transferor account and an amount for executing the monetary transfer, to the second user device for execution.

In Example 2, the subject matter of Example 1 includes, wherein the configured executable application is a single run executable application that deletes itself after running.

In Example 3, the subject matter of Examples 1-2 includes, wherein configuring the executable application includes encrypting the executable application.

In Example 4, the subject matter of Examples 1-3 includes, wherein the operating capability of the second user device is based on at least one of a device type, an operating system, a hardware component, or a secure environment.

In Example 5, the subject matter of Examples 1-4 includes, receiving, during the handshake, an encryption type or a file size limit.

In Example 6, the subject matter of Examples 1-5 includes, in response to receiving an indication that the second user device has run the configured executable application, running, at the first user device, a version of the executable application configured according to an operating capability of the first user device.

In Example 7, the subject matter of Example 6 includes, wherein running the version of the executable application includes outputting a confirmation of the monetary transfer.

In Example 8, the subject matter of Examples 1-7 includes, wherein configuring the executable application includes configuring the executable application to only run within a secure environment of the second user device, the secure environment including an enclave region of memory of the second user device.

In Example 9, the subject matter of Examples 1-8 includes, wherein the configured executable application includes a handler configured to convert a first data structure created by the first user device using a first format of a first monetary transfer application to a second data structure having a second format that is readable by a second monetary transfer application.

In Example 10, the subject matter of Examples 1-9 includes, wherein the money transfer is configured to occur from the transferor account, which is an account of a user of the first device, to an account of a user of the second user device.

Example 11 is a first user device comprising: processor circuitry; and memory, including instructions, which when executed by the processing circuitry, causes the processing circuitry to perform operations to: initiate a handshake with a second user device; receive, during the handshake, an operating capability of the second user device; configure, based on the operating capability of the second user device, an executable application, which when executed, automatically causes a monetary transfer to occur; and send the configured executable application, including information indicative of a transferor account and an amount for executing the monetary transfer, to the second user device for execution.

In Example 12, the subject matter of Example 11 includes, wherein the configured executable application is a single run executable application that deletes itself after running.

In Example 13, the subject matter of Examples 11-12 includes, wherein to configure the executable application, the instructions further cause the processing circuitry to encrypt the executable application.

In Example 14, the subject matter of Examples 11-13 includes, wherein the operating capability of the second user device is based on at least one of a device type, an operating system, a hardware component, or a secure environment.

In Example 15, the subject matter of Examples 11-14 includes, wherein an encryption type or a file size limit is received during the handshake.

In Example 16, the subject matter of Examples 11-15 includes, wherein the instructions further cause the processing circuitry to, in response to receiving an indication that the second user device has run the configured executable application, run, at the first user device, a version of the executable application configured according to an operating capability of the first user device.

In Example 17, the subject matter of Example 16 includes, wherein a confirmation of the monetary transfer is output by the first user device from the version of the executable application.

In Example 18, the subject matter of Examples 11-17 includes, wherein the configured executable application is configured to only run within a secure environment of the second user device, the secure environment including an enclave region of memory of the second user device.

In Example 19, the subject matter of Examples 11-18 includes, wherein the configured executable application includes a handler configured to convert a first data structure created by the first user device using a first format of a first monetary transfer application to a second data structure having a second format that is readable by a second monetary transfer application.

In Example 20, the subject matter of Examples 11-19 includes, wherein the money transfer is configured to occur from the transferor account, which is an account of a user of the first device, to an account of a user of the second user device.

Example 21 is a method comprising: performing, at a first user device, a handshake with a second user device; receiving, during the handshake, an operating capability of the second user device, and a requested amount to transfer; configuring, using a processor of the first user device and based on the operating capability of the second user device, an executable application, which when executed, automatically causes a monetary transfer to occur; determining whether an amount received via a user interface of the first user device matches the requested amount; and compiling the executable application only in response to determining that the amount received via the user interface matches the requested amount.

Example 22 is at least one machine-readable medium including instructions that, when executed by processing circuitry, cause the processing circuitry to perform operations to implement of any of Examples 21-21.

Example 23 is an apparatus comprising means to implement of any of Examples 21-21.

Example 24 is a system to implement of any of Examples 21-21.

Example 25 is a method to implement of any of Examples 21-21.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
performing, at a first user device, a handshake with a second user device;
receiving, during the handshake, an operating capability of the second user device;
configuring, using a processor of the first user device and based on the operating capability of the second user device, an executable application, which, when executed, automatically initiates a financial transaction to occur; and
sending the configured executable application, including information to complete the financial transaction, to the second user device for execution.

2. The method of claim 1, wherein the configured executable application is a single-run executable application that deletes itself after running.

3. The method of claim 1, wherein configuring the executable application includes encrypting the executable application at the first user device.

4. The method of claim 1, wherein the operating capability of the second user device is based on at least one of a device type, an operating system, a hardware component, or a secure environment.

5. The method of claim 1, further comprising, in response to receiving an indication that the second user device has run the configured executable application, running, at the first user device, a version of the executable application configured according to an operating capability of the first user device.

6. The method of claim 5, wherein running the version of the executable application includes outputting a confirmation of the financial transaction.

7. The method of claim 1, wherein configuring the executable application includes configuring the executable application to only run when within a secure environment, the secure environment including a secure enclave region of memory of the second user device.

8. The method of claim 1, wherein the configured executable application includes a handler configured to convert a first data structure created by the first user device, using a first format of a first financial transaction application, to a second data structure having a second format that is readable by a second financial transaction application.

9. The method of claim 1, wherein the financial transaction is a money transfer configured to occur from a transferor account of a user of the first user device to an account of a user of the second user device.

10. The method of claim 1, further comprising, receiving, during the handshake, an encryption type or a file size limit.

11. A first user device comprising:
processor circuitry; and
memory, including instructions, which when executed by the processing circuitry, causes the processing circuitry to perform operations to:
initiate a handshake with a second user device;
receive, during the handshake, an operating capability of the second user device;
configure, based on the operating capability of the second user device, an executable application, which, when executed, automatically initiates a financial transaction to occur; and
send the configured executable application, including information to complete the financial transaction, to the second user device for execution.

12. The first user device of claim 11, wherein the configured executable application is a single-run executable application that deletes itself after running.

13. The first user device of claim 11, wherein to configure the executable application, the instructions further cause the processing circuitry to encrypt the executable application.

14. The first user device of claim 11, wherein the operating capability of the second user device is based on at least one of a device type, an operating system, a hardware component, or a secure environment.

15. The first user device of claim 11, wherein the executable application includes a unique identifier, the unique identifier identifying at least one of the financial transaction or the first user device.

16. The first user device of claim 11, wherein the instructions further cause the processing circuitry to, in response to receiving an indication that the second user device has run the configured executable application, run, at the first user device, a version of the executable application configured according to an operating capability of the first user device; and output a confirmation of the financial transaction by the first user device from the version of the executable application.

17. The first user device of claim 11, wherein the configured executable application is configured to only run within a secure environment of the second user device, the secure environment including a secure enclave region of memory of the second user device.

18. The first user device of claim 11, wherein the configured executable application includes a handler configured to convert a first data structure created by the first user device, using a first format of a first financial transaction application, to a second data structure having a second format that is readable by a second financial transaction application.

19. The first user device of claim 11, wherein the financial transaction is a money transfer configured to occur from a transferor account of a user of the first user device, to an account of a user of the second user device.

20. At least one non-transitory machine readable medium including instructions, which when executed by processing circuitry of a first user device, cause the processing circuitry to perform operations to:
perform a handshake with a second user device;
receive, during the handshake, an operating capability of the second user device;
configure, based on the operating capability of the second user device, an executable application, which, when executed, automatically initiates a financial transaction to occur, the configured executable application including information to complete the financial transaction; and
send a link to access the configured executable application to the second user device for execution.

* * * * *